March 18, 1958  W. B. SCHUMACHER  2,826,933
SELF RE-SETTING CONTROL MECHANISM
Filed March 28, 1955
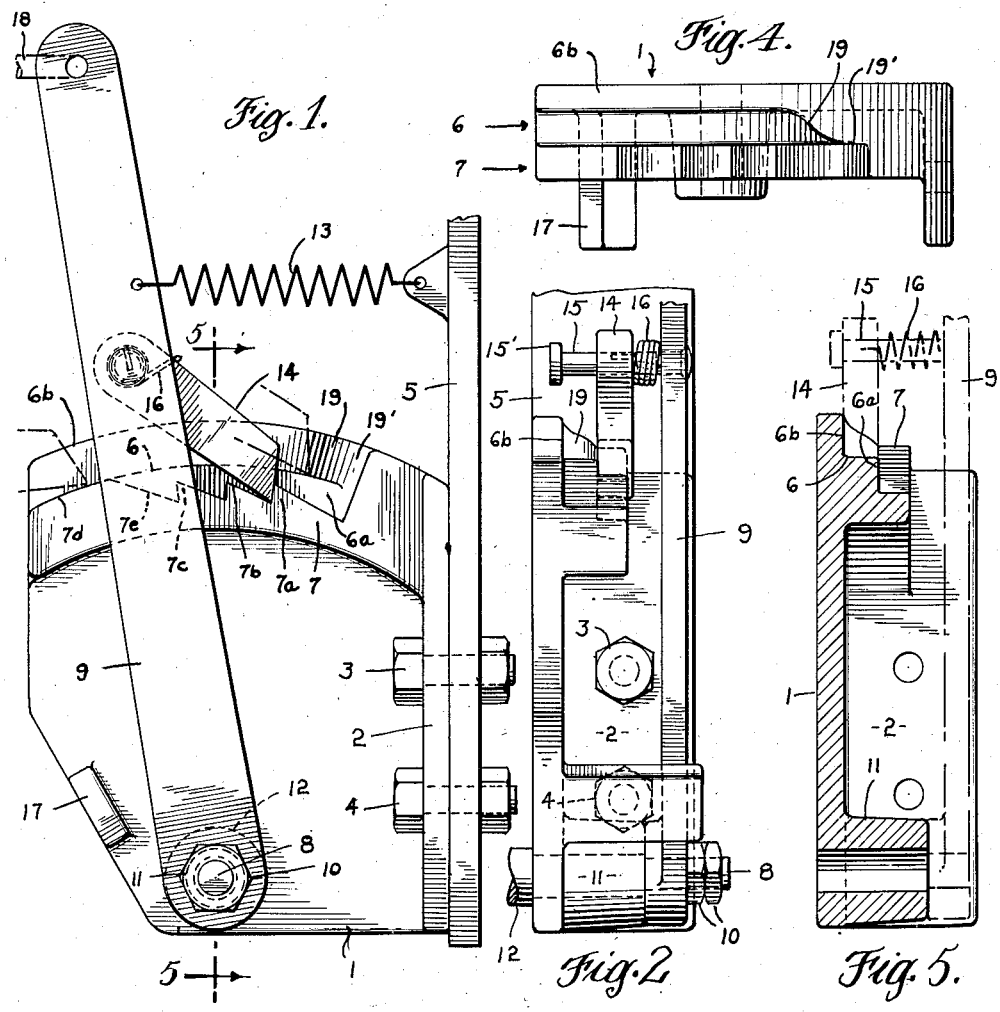
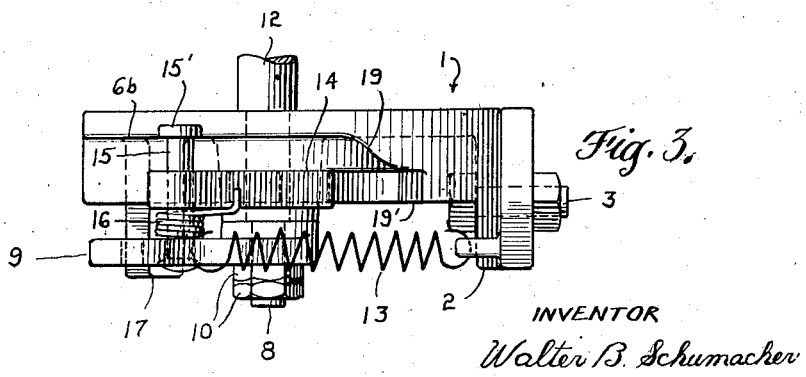
INVENTOR
Walter B. Schumacher
Richard E. Babcock, Jr.
ATTORNEY

United States Patent Office 2,826,933
Patented Mar. 18, 1958

2,826,933

SELF RE-SETTING CONTROL MECHANISM

Walter B. Schumacher, New Holland, Pa., assignor, by mesne assignments, to Sperry Rand Corporation, New Holland, Pa., a corporation of Delaware Application March 28, 1955, Serial No. 497,092

12 Claims. (Cl. 74—535)

This invention relates to a self-re-setting control mechanism. It is the primary object of the invention to provide a control mechanism in which the primary control element is moveable through a predetermined range of control movement whereby it may act through a linkage to a controlled mechanism to maintain same in one or more selected positions of operation and which, upon being moved beyond such range of control movement is automatically returned to its starting position.

By virtue of its automatic return feature, the control mechanism of the invention is particularly adapted for actuation through a flexible cable or other means capable of transmitting a control force in but one direction. Such a mechanism thus is admirably adapted for use on a trailing vehicle to be remotely controlled from the seat of the tractor which is used to tow such trailing vehicle, although it is by no means limited to such use.

In accordance with the invention, the control mechanism embodies a primary control element which is guided for movement parallel to a set of control and return tracks. This control element supports a pawl for transverse shifting movement into operative relation with either of the tracks, the control track having one or more ratchet teeth for cooperation with the pawl to maintain the control element in one or more selected control positions against a resilient return pull or force exerted either by the controlled mechanism or by any conventional arrangement of resilient means, and means are provided at the extremities of the range of movement of the control element for coacting with the pawl to effect its lateral or transverse shifting from one track to the other.

Spring means associated with the pawl and/or the control element tends constantly to urge the pawl transversely toward a position overlying the return track; however, the control track is positioned somewhat lower than the return track so that when engaged with the control track the pawl is retained over the control track by abutting engagement with the side wall of the return track or equivalent dividing means. Means positioned on the control track engages the pawl when same is moved in a control direction to a predetermined extent and raises the pawl to the level of the upper or return track so that the spring means associated with the pawl and/or the lever may automatically transversely shift the pawl into operative relation with the return track which, being smooth, permits automatic return of the conrol element to its starting position under the influence of the said yieldable means. A transversely inclined cam surface at the terminal end of the return track shifts said pawl transversely back into cooperative relation with the lower track as the pawl approaches its starting position.

In the accompanying drawings:

Figure 1 represents a side elevation of a control mechanism in accordance with the invention, the pawl being shown in broken lines near opposite extremities of its operative range of movement;

Figure 2 is an end elevation looking toward the right in Figure 1;

Figure 3, a plan view of Figure 1;

Figure 4, a plan view of the casting or bracket in which the guide tracks are formed; and Figure 5, a section on the line 5—5 of Figure 1. The control element or lever and the pawl in this view being shown in broken lines and the pawl being shifted to operative position over the return track.

Referring now in detail to the accompanying drawing, the invention in the form there illustrated comprises a bracket or body 1 of cast metal or other suitable, preferably integral construction, having a base 2 bolted as at 3 and 4 to a suitable supporting member or structure 5.

At its upper edge or periphery, the bracket 1 is formed to define a pair of parallel, preferably arcuately curved, tracks 6 and 7, respectively, which, in the preferred embodiment, are concentric about a common axis of curvature defined by pin 8 and are in axially adjoining relation to each other. The radially innermost or lower control track 7 is provided with one or more radially upwardly projecting ratchet teeth 7a, 7b, and 7c in series, together with a raised portion 7d, the arcuate surface of which is at least on a level with, or radially spaced from the center of curvature 8 at least as far as the smooth arcuate surface of the return track 6. It will be noted that the return track 6 presents a smooth side wall 6a toward and adjoining the track 7.

A lever or primary control element 9 is associated with bracket 1 for control swinging movement in one direction and return swinging movement in an opposite direction about the common axis of curvature 8 of said tracks 6 and 7. It will be noted that the lever 9 is fixed or secured by a nut 10 on the threaded pin 8 which comprises the reduced end portion of a rock shaft 12 which is journaled transversely through the bracket 1.

Yieldable resilient means, such as the spring 13 connected under tension between the lever 9 and support 5, exerts a force constantly urging the lever 9 in a return direction or toward the right in Figure 1. A pawl 14 adapted for operative engagement with the ratchet teeth 7a, 7b, and 7c is carried by the lever 9 for transverse shifting movement from one track 6 or 7 to the other. It will be seen that the pawl 14, by cooperation with the ratchet teeth 7a, 7b, or 7c is operative to maintain the lever 9 in any of several selected positions of adjustment against the return or retractive force exerted by the spring 13.

In order to permit transverse movement or shifting of the pawl 14 from one track to the other, the pawl 14 in the instant embodiment is both pivotally and axially slideably disposed on a transverse pin or pintle 15 fixed to lever 9. This pin 15 serves as a guide for pawl 14 in its transverse movement. Connected under both torsion and compression between the pawl 14 and the lever 9 is a spiral spring 16 which is coiled about pin 15.

It will be seen that as the lever 9 is swung toward the left, or in a control direction, in Figure 1, substantially as far as permitted by the stop 17, pawl 14 will be moved successively over the teeth 7a, 7b, and 7c, thence onto the raised surface 7d, preferably by way of an inclined cam surface 7e extending between said raised surface 7d and the base of the last ratchet tooth 7c. During such movement, the pawl will be retained over track 7 against the pressure of spring 13 by virtue of its engagement with the side wall 6a of track 6. As soon as the pawl 14 rides up onto the surface 7d at or above the level of the adjoining track 6, the compressed spring 16 will automatically shift said pawl 14 transversely onto the track 6. Since the track 6 is smooth and devoid of any ratchet teeth or other projections which might be engaged by the pawl 14, a release of the control force on the lever 9 will permit the spring 13 to automatically swing or return the lever or control element 9 back to its starting position. Since the spring 13 will thus function to automatically return the lever, same may obviously be controlled or actuated from a remote point by means of a cord or other flexible tension element 18 shown fragmentarily in Figure 1 connected to said lever.

Along one side edge on the side thereof remote from the track 7, track 6 is preferably provided with an upstanding side wall 6b which extends parallel to the track 6 for the majority of its length and, together with the enlarged head 15' of the pin 15, limits the transverse movement of the pawl 14 under the influence of spring 16. At or near the return end of the track 6 this side wall 6b merges with a cam surface 19 which is inclined transversely across the said track 6 so that continued return movement of the lever 9 an pawl 14 and the ensuing cooperation of the pawl 14 with this cam surface 19 will move the pawl transversely back over the ratchet toothed track 7. It will be noted that this cam surface 19 terminates in a portion 19' which is in the same plane as the wall 6a and constitutes an upward continuation thereof so that once the free end of the pawl 14 is received on this surface 19' the spring 16 may urge it downwardly below the top of wall 6a into operative relationship with the track 7 preparatory to a new control movement of the lever 9.

In the use of a control mechanism such as above described same may be advantageously employed in a variety of applications, as for instance, to control the brakes of a vehicle. However, by way of specific illustration, it is pointed out that such a mechanism has advantageously been used to control the operation and speed of the feed apron and feeder mechanism of a manure spreader of the type disclosed in the A. M. Best, United States Patent 2,699,337 of January 11, 1955. In such application, the bracket 1 and lever 9 are substituted for the bracket 68 and lever 64, respectively, of said patent, the lever 9 being connected through the rock shaft 12 with the mechanism to be controlled. In such use, it will be apparent, that as the lever is progressively positioned in engagement with the successive ratchet teeth 7a, 7b, and 7c, it will act through the rock shaft 12 to exert varying effects upon the controlled mechanism. After the lever 9 has been swung to the left through its full range of control movement, continued movement in the same direction and the coaction of the pawl 14 with the raised surface 7d and/or the incline 7e will then permit the spring 16 to automatically transversely shift the pawl over to the return track 6 for return movement therealong under the influence of spring 13. As the pawl nears the end of this return movement, its coaction with the cam surface 19 will return it transversely to operative position over the track 7 and the spring 16 will tend to swing it downwardly into operative engagement with such track 7 from the adjoining surface 19'.

In this invention I have shown and described only the preferred embodiment of my invention simply by way of illustrating the preferred mode of carrying out the invention as by law required. However, the broad inventive concept is capable of embodiment in other and different forms and the various parts of the mechanism may obviously be modified without departing from my invention. Accordingly, the drawings and description herein are to be construed as merely illustrative and not as exclusive.

Having thus described the invention, I claim:

1. A self-resetting control mechanism comprising a bracket defining a generally arcuate toothed control track and an arcuate smooth-surfaced return track, said tracks being concentric about a common axis of curvature and axially adjoining each other, said return track projecting radially beyond the teeth of said control track and having a side wall in a general radial plane adjoining said control track, a control lever associated with said bracket for control swinging movement in one direction, and return swinging movement in an opposite direction about the common axis of curvature of said tracks, yieldable means urging the lever in a return direction, a pawl carried by said lever for operative engagement with said toothed track to retain the lever in any of various selected control positions against the return force exerted by said yieldable means, and for transverse shifting movement from one said track to the other, resilient means normally urging said pawl transversely toward the radial plane of said return track, the side wall of the return track normally maintaining the pawl operatively positioned relative to the toothed track, means fixed at the outer end of said toothed track in the path of outgoing movement of said pawl for engaging and moving said pawl radially outwardly beyond the side wall of the return track whereby said resilient means may move said pawl transversely from operative relation with the toothed track into operative relation with the return track to permit automatic return of said lever by the said yieldable means, and transversely inclined cam means at the return end of said return track for switching said pawl back to operative relation with said toothed track under the pull of said yieldable means.

2. A self-re-setting control mechanism comprising a bracket defining a generally arcuate control track, having one or more ratchet teeth projecting radially therefrom, and an arcuate smooth-surfaced return track, said tracks being generally concentric about a common axis of curvature and axially adjoining each other, said return track projecting radially beyond the teeth of said control track, a lever associated with said bracket for control swinging movement in one direction and for return swinging movement in an opposite direction about the common axis of curvature of said tracks, yieldable means urging the lever in a return direction, a pawl carried by said lever for operative engagement with said toothed control track to retain the lever in a selected control position against the return force exerted by said yieldable means and for transverse shifting movement from one said track to the other, cam means cooperating with said pawl at a predetermined location along said control track for moving the pawl radially outwardly beyond the return track, and means associated with said pawl for then moving same into operative relation with the return track to permit automatic return of said lever by the said yieldable means, and a transversely inclined cam means at the return end of said return track for switching the pawl transversely back to operative relation with the toothed control track responsive to the urge of said yieldable means.

3. A self-re-setting control mechanism comprising a bracket defining a generally arcuate toothed control track having one or more ratchet teeth thereon, and an arcuate smooth-surfaced return track, said tracks being concentric about a common axis of curvature and axially adjoining each other, said return track projecting radially beyond the teeth of said control track, a lever associated with said bracket for control swinging movement in one direction and return swinging movement in an opposite direction about the common axis of curvature of said tracks, yieldable means urging the lever in a return direction, a pawl carried by said lever for operative engagement with said toothed track to retain the lever in a selected control position against the return force exerted by said yieldable means and for transverse shifting movement from one said track to the other, cam means cooperating with the pawl at a predetermined location along said control track for moving the pawl radially outwardly beyond the return track, and means cooperating with the pawl for then shifting it transversely into operative relation with said return track to permit automatic return of the lever by said yieldable means.

4. A self-re-setting control mechanism comprising a bracket defining a generally arcuate toothed control track having at least one ratchet tooth projecting radially therefrom and an arcuate smooth-surfaced return track, said track being concentric about a common axis of curvature and axially adjoining each other, said return track projecting radially beyond the teeth of said control track, and having a side wall in a generally radial plane adjoining said control track, a lever associated with said bracket for control swinging movement in one direction and for return swinging movement in an opposite direction about the common axis of curvature of said tracks, yieldable means urging the lever in a return direction, a pawl carried by said lever for operative engagement with said toothed track to retain the lever in a selected control position against the return force exerted by said yieldable means and for transverse shifting movement from one said track to the other, resilient means normally urging said pawl transversely toward operative relationship with the return track, the side wall of the return track normally maintaining the pawl operatively positioned relative to the toothed track, means for shifting the pawl radially outwardly beyond the return track at a predetermined point of its control movement whereby said resilient means may be rendered operative, and a transversely inclined cam means at the return end of said return track for switching the pawl transversely back to operative relation with the control track.

5. The combination of claim 1 in which a transversely extending pin is carried by said lever and the pawl is mounted on this pin for both transverse and pivotal movement.

6. A multiple position self-re-setting control mechanism comprising a pair of parallel tracks disposed at different levels with a side wall of said upper track defining an abutment adjoining said lower track, the lower track having in series a plurality of ratchet teeth projecting upwardly to a level below that of the upper track, a control element, means for supporting said element for control movement in one direction parallel to said tracks and for return movement in an opposite direction, yieldable means urging said element in a return direction, a pawl carried by said control element for movement along either of said tracks, said pawl normally being disposed for cooperation with the ratchet teeth of said lower track to prevent return movement of the element from various selected control positions, means supporting the pawl on said element for transverse shifting movement between said tracks into cooperative relation with either, resilient means normally urging the pawl transversely toward cooperative relationship with the return track and into engagement with said abutment, and cam means cooperating with said pawl at a predetermined location along said lower track to raise the pawl to the level of said upper track whereby said resilient means may move said pawl transversely onto the upper track.

7. The combination of claim 6 including transversely inclined cam means at the return end of said return track for transferring said pawl transversely into cooperative relation with said lower track.

8. A multiple position self-re-setting control mechanism comprising a pair of parallel upper and lower tracks, the lower track having in series a plurality of ratchet teeth projecting upwardly to a level below that of the upper track, a control element, means supporting said element for control movement in a direction parallel to said tracks and for return movement in an opposite direction, a pawl carried by said control element for movement along either of said tracks, said pawl normally being disposed for cooperation with the ratchet teeth of said lower track to prevent return movement of the control element from various selected control positions, means supporting the pawl on said control element for transverse shifting movement between said tracks and into cooperative relation with either, resilient means normally urging the pawl transversely toward cooperative relation with the return track, and cam means cooperating with said pawl at a predetermined location along said lower track to raise the pawl to the level of the upper track, whereby said resilient means may move it transversely onto the upper track.

9. A multiple position self-re-setting control mechanism comprising a pair of parallel upper and lower tracks, a side wall of said upper track defining an abutment adjoining said lower track, the lower track having in series a plurality of ratchet teeth projecting upwardly to a level below that of the upper track, a control element, means supporting said element for control movement in a direction parallel to said tracks and for return movement in an opposite direction, yieldable means urging said element in a return direction, a pawl carried by said control element for transverse movement into operative relation with either of said tracks, cam means cooperating with said pawl at a predetermined location along the lower track to raise it to the level of the upper track, and resilient means for then causing transverse movement of the pawl onto the upper track.

10. A multiple position self-re-setting control mechanism comprising a pair of parallel upper and lower tracks, one of said tracks having in series a plurality of ratchet teeth projecting toward the level of the other track, a control element, means supporting said element for control movement in a direction parallel to said tracks and for return movement in an opposite direction, yieldable means urging said element in a return direction, a pawl carried by said control element for transverse movement into operative relation with either of said tracks, and cam means cooperating with said pawl at one end of the respective tracks to switch it from one to the other of said tracks.

11. A self-re-setting control mechanism comprising a control track having a series of stops thereon, a control element normally positioned at one end of said track, means for supporting said control element for step movement over said stops toward the end of said track opposite said one end, means biasing said control element toward said one end of said track, means operable adjacent said opposite end of said track for shifting said control element laterally outwardly so that said biasing means may return the control element past said stops and toward said one end of said track, and means adjacent said one end of said track for shifting said control element laterally inwardly as the element is moved by said biasing means toward said one end.

12. A self-re-setting control mechanism comprising a control track having a series of ratchet teeth thereon, a pawl normally positioned at one end of said track, an arm supporting said pawl for step movement over said ratchet teeth and toward the end of said track opposite said one end, means biasing said arm toward said one end of said track, means operable adjacent said opposite end of said track for shifting said pawl laterally outwardly relative to said arm and the direction of extent of the track whereby said biasing means may return said pawl and arm toward said one end of the track, and cam means adjacent said one end of said track for shifting said pawl laterally inwardly as the pawl and arm are returned by said biasing means.

References Cited in the file of this patent

UNITED STATES PATENTS 2,308,898    Skareen  ---------------- Jan. 19, 1943